R. W. STEED.
ADJUSTABLE POWER UNIT FOR DOMESTIC USE.
APPLICATION FILED AUG. 13, 1915.
1,180,333.
Patented Apr. 25, 1916.
2 SHEETS—SHEET 1.
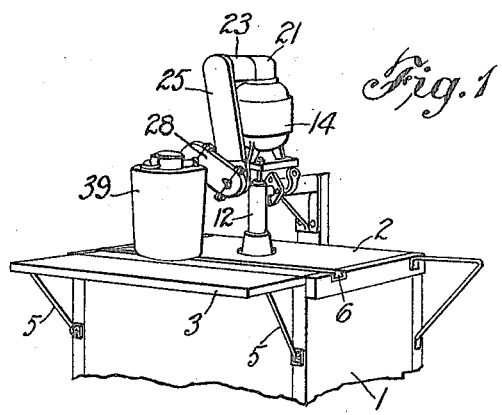
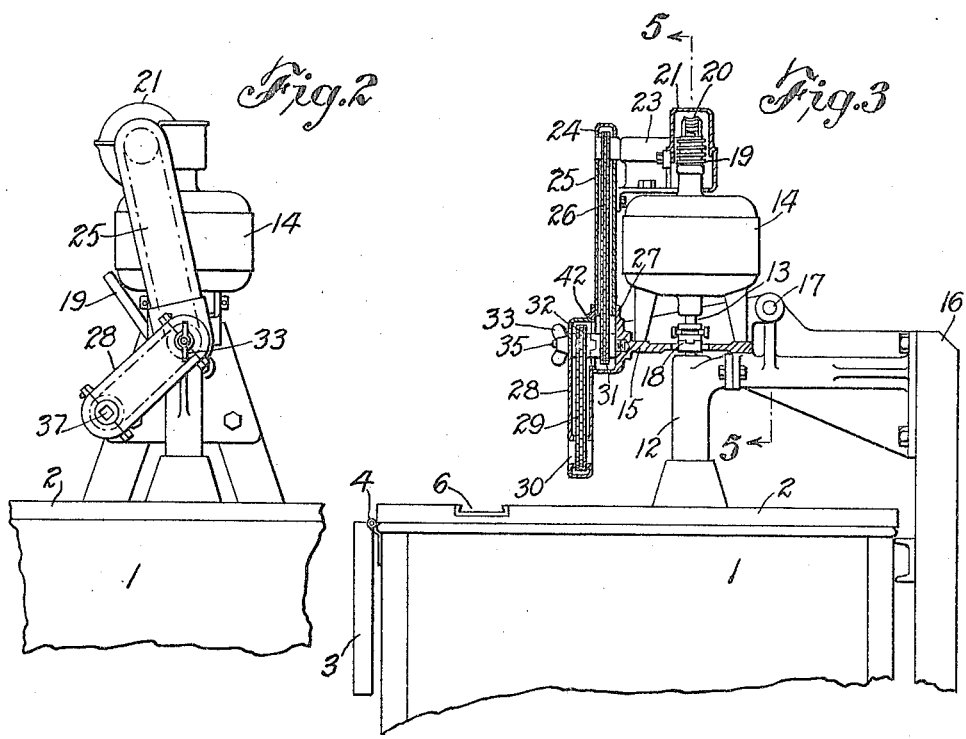
Inventor
Robert W. Steed
per Fred A. Acker
Atty.

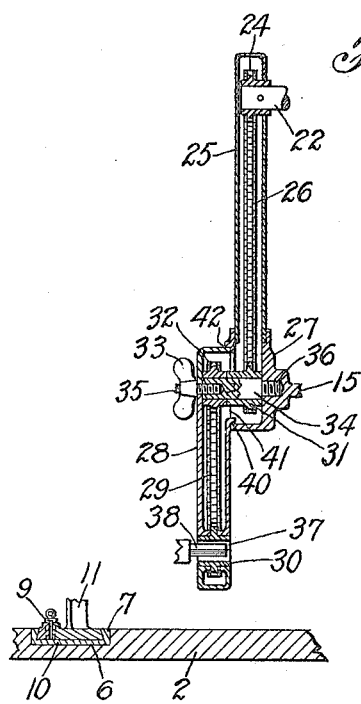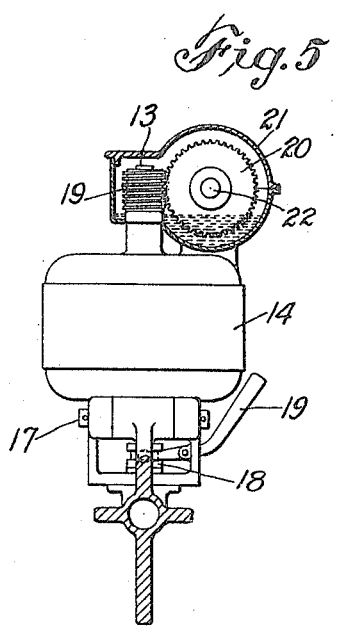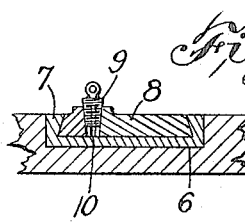

UNITED STATES PATENT OFFICE.

ROBERT W. STEED, OF MAPLEWOOD, NEW JERSEY.

ADJUSTABLE POWER UNIT FOR DOMESTIC USE.

1,180,333.  Specification of Letters Patent. Patented Apr. 25, 1916.

Application filed August 13, 1915. Serial No. 45,309.

*To all whom it may concern:*

Be it known that I, ROBERT W. STEED, a citizen of the United States, residing at Maplewood, in the county of Essex and State of New Jersey, have invented certain new and useful Improvements in Adjustable Power Units for Domestic Use, of which the following is a specification, reference being had therein to the accompanying drawing.

My present invention refers to a power device for kitchen or domestic use and the like, having for its object the efficient driving of small household utensils, such as dish washers, ice cream freezers, coffee grinders, nutmeg graters, food choppers, egg beaters, cake mixers, raisin seeders, apple corers, ice planes, and similar instrumentalities for culinary and domestic use, so that it may be possible to couple any one of these devices to the power mechanism and by a brief use of said mechanism, enable the device to be operated for its particular purpose and produce the results required. As a convenient means for actuating the power device, I utilize the driving shaft of a domestic dish washing machine contrivance covered by my former Letters Patent No. 1,090,420, granted to me by the United States on March 17, 1914, and thus greatly simplify the installation of machinery in the kitchen, by employing a motive power thus already at hand in the place where my dish washer has been located, and, by proper adjustable connections, providing that this motive power of the dish washer may be indifferently and convertibly applied to any one of the devices mentioned or any other similar device which may be needed for use in the discharge of the household economy. The invention, therefore, comprises essentially a suitable motor device together with means for connecting it to an ice cream freezer, or other device which is to be driven, said means being adjustable and changeable in position and relative location, so that it may be possible to connect up the motor and the device to be driven in different angular positions, and enable the power of the motor to be transferred to the driven device and the latter actuated for a longer or shorter time so as to produce the required results; and the invention furthermore comprises numerous details and peculiarities in the construction, arrangement and combination of the various parts, substantially as will be hereinafter described and then more particularly pointed out in the claims.

In the accompanying drawing illustrating my invention: Figure 1 is a perspective view of my improved adjustable power connecting mechanism operating as a kitchen or household unit; Fig. 2 is a side elevation of the same; Fig. 3 is a vertical section with certain parts in elevation; Fig. 4 is a similar vertical section on an enlarged scale; Fig. 5 is a detail view in partial section of the electric motor and certain of the other parts; Fig. 6 is an enlarged cross section of one form of means for securing the driven devices to the table of the dish washing machine.

Similar characters of reference designate corresponding parts throughout the different figures of the drawing.

As already stated, as a convenient way of installing and utilizing a power unit for domestic use, I take a dish washing machine having a tank 1, on the table 2 of which some of the mechanical parts may be mounted, said table having a folding leaf 3, which is hinged at 4, and adapted to be either lifted into the position shown in Fig. 1 and there held by braces 5, or dropped down into the position shown in Fig. 3 where it is temporarily out of the way. The table 2 is preferably provided on its surface with a groove 6 containing a dovetailed metal plate 7 which receives adjustably a dovetailed block 8 held firmly within the dovetailed plate 7 by means of a tapered screw plug 9 working in a slot 10 in the block 8 and thereby clamping the block firmly in the dovetailed groove, said block 8 carrying a foot or standard 11 of any desired form which may belong to an ice cream freezer, a cake mixer, or any one of a large number of culinary devices which it is desired to drive by means of a power unit for domestic use.

The working mechanism of the dish washing machine is contained within the tank 1 and is not shown, and the shaft 13 for driving said mechanism extends upward through the table 2 and standard 12, as shown in Fig. 3. Shaft 13 is driven by an electric motor 14 mounted on a suitable frame 15 carried by a bracket 16, the frame 15 being hinged at 17 to the bracket 16 so that it can be lifted up and down. A clutch mechanism 18 operated by a lever 19 enables the motor 14 to be operatively connected to or disconnected from the shaft 13 at the will of the user. It is unnecessary to describe any of the other parts of the dish washer in this connection, it being sufficient to state that the dish washer unit installed in the kitchen or other place is availed of for supplying power to actuate the various culinary appliances already designated, and the shaft 13 of the dish washer, which shaft is actuated by the motor 14, is the chief mechanical feature to be considered since it is that from which power is taken off to drive the said devices. This shaft 13, above the motor 14, is provided with a worm 19, which engages and drives a worm wheel 20, the worm 19 and the worm wheel 20 being incased within a housing 21 partially filled with lubricating material so that the parts may run easily and smoothly. The worm wheel 20 is securely fastened to a shaft 22 supported in a bearing 23 fast on the main frame, and this shaft 22 carries at its opposite end a sprocket wheel 24.

25 denotes an elongated casing or frame, in one end of which the aforesaid sprocket wheel 24 is journaled, while in the opposite end is another sprocket wheel 31. A chain 26 runs around these sprocket wheels 24 and 31. The casing 25 has its lower end 27 connected closely to or made integral with the frame 15, already mentioned, which supports the motor 14; while the upper end of the frame 25 is closely contiguous to, and, if desired, is secured to, the bearing 23 for the upper shaft 22 which drives the sprocket wheel 24. In this way, therefore, the casing 25 which houses the sprocket wheels 24 and 31 and the chain 26 is held in a rigid position alongside of the motor 14.

The lower sprocket wheel 31 revolves loosely on a short shaft 34, having a screw-threaded stud 36, which screws firmly into the part 27, which I have said is connected to the frame 15. On the same shaft 34 is another sprocket wheel 32, which connects by a jaw clutch 37 (see Fig. 3) with the sprocket wheel 31, so that when the parts are assembled together in their normal operative relation, as shown in Fig. 4, the two sprocket wheels 32 and 31 will revolve in unison. In the outer end of the shaft 34 is a fixed screw pin 35, on which is a thumb nut 33 which clamps against the casing 28 and binds the same firmly against the end of the shaft 34. This casing 28 is an extremely important feature of my present invention, for it is adjustable for a purpose to be presently specified. It houses the sprocket wheel 32, a chain 29 passing around said sprocket wheel, and another sprocket wheel 30 which is journaled in the outer end of the casing 28. The chain 29 passes around the sprocket wheels 30 and 32 so that motion is communicated by said chain from the sprocket wheel 32 to the sprocket wheel 30. The manner in which the wheel 30 is journaled in the outer end of the casing 28 is clearly shown in Figs. 3 and 4. In center of the sprocket wheel 30 is an opening 37, preferably square, although it may be any desired shape which receives a shaft, as, for example, the square shaft 38 portrayed in Fig. 4, belonging to the ice cream freezer mechanism indicated at 39 in Fig. 1, or to any other one of the appliances or instrumentalities which the power unit is designed and contrived to actuate. This, however, is only one way in which the mechanism may transfer its propulsive effect to the driven device, and I do not wish to be restricted thereto and reserve the liberty of providing any kind of means for enabling the power unit to connect itself operatively with a shaft or other part of the driven element.

The casing 28 and its contained mechanical features are, therefore, adjustable up and down relatively to the top surface of the table 2 and also relatively to the driven device as, for example, the ice cream freezer 39. This adjustment is effected in the manner already indicated, it being obvious that the casing 28 has at its upper end a flange 40 that engages an opening at 41 in the lower end 27 of the casing 25, said casing 28 having also its end 42 engaging the same opening 41 so that the said casing 28 swivels on the lower end of the casing 25, and in so turning, is readily adjusted up and down. By loosening the thumb nut 33, the edges 40 and 41 are released, since the casing 28 is released from being clamped against the end of the shaft 34, and thus the casing 28 can be lifted up and down, carrying with it obviously its inner mechanism, and particularly the sprocket wheel 30 to which the shaft, as 38, of the driven device is to be connected. Thus the sprocket wheel 38 can be placed at any desired elevation to correspond with the elevation of the driven device which is located alongside of it, so that the shaft of said device may be easily connected with the sprocket wheel 30, and the square portion of said shaft, as 38, caused to enter the correspondingly-shaped opening 37 in the sprocket wheel 30, or otherwise, in order to promote unity of operation and bring about the desired results.

Many changes may be made in the precise construction, arrangement and combination of the various mechanical parts without exceeding the scope of my invention, and I desire to reserve the liberty of making all such necessary changes as experience and the best mechanical judgment may advise.

Having thus described my invention, what I claim as new and desire to secure by Letters Patent, is:

1. In a device of the class described, the combination with a shaft and a motor driving it, of a worm on said shaft, a worm wheel, an inclosing lubricant case for said worm and wheel, a pair of sprocket wheels and a chain, all driven by said worm wheel, a second pair of sprocket wheels and a chain, all driven by the aforesaid sprocket mechanism, said latter sprocket wheels and chain being adjustable in position, and a casing containing the adjustable sprocket wheels and chain, said casing being adapted to be raised or lowered in order to place it in proper position with relation to a driven unit, and means for securing it in any desired position.

2. In a device of the class described, the combination of a driving shaft, a worm thereon, a worm wheel driven thereby, a shaft driven by the worm wheel and carrying a sprocket wheel, a second sprocket wheel, a chain connecting the said sprocket wheels, and an adjustable casing mounted movably in proximity to the aforesaid sprocket wheels and chain, a sprocket wheel in said casing driven by the aforesaid sprocket wheels and chain, another sprocket wheel journaled in the outer end of said adjustable casing, a chain connecting said latter sprocket wheels, and means for clamping the casing in any desired position.

3. In a device of the class described, the combination with a driving shaft, of a sprocket wheel actuated thereby, a second sprocket wheel, a chain passing around them, said sprocket wheels being supported and suitably housed in a casing, and an adjustable casing movable relatively to the other casing, a sprocket wheel within said casing actuated by one of the other sprocket wheels, a second sprocket wheel in the adjustable casing, said sprocket wheel being adapted to actuate the shaft of a driven element, and a chain connecting the sprocket wheels in said adjustable casing, together with a clamping device for holding the adjustable casing in any desired position.

4. In a device of the class described, the combination of a sprocket wheel, means for actuating it, a second sprocket wheel, a chain connecting the two wheels, a shaft on which said second sprocket wheel is supported, another sprocket wheel on said shaft having means for clutching the companion sprocket on said shaft, a casing inclosing the said sprocket wheel, another sprocket wheel in the end of said casing, a chain connecting said sprockets, and a clamping device for securing the casing against the end of the said sprocket-carrying shaft and holding it in any desired position.

In testimony whereof I affix my signature.

ROBERT W. STEED.

Copies of this patent may be obtained for five cents each, by addressing the "Commissioner of Patents, Washington, D. C."